US006889574B2

(12) United States Patent
Meyer

(10) Patent No.: US 6,889,574 B2

(45) Date of Patent: May 10, 2005

(54) FIXING DEVICE FOR SECURING AN ACTUATING CABLE

(75) Inventor: Jörg Meyer, Wagenfeld (DE)

(73) Assignee: ZF Lemförder Metallwaren AG, Stemwede-Dielingen (DE)

(*) Notice: Subject to any disclaimer, the term of this patent is extended or adjusted under 35 U.S.C. 154(b) by 0 days.

(21) Appl. No.: 10/240,013

(22) PCT Filed: Feb. 15, 2002

(86) PCT No.: PCT/DE02/00564

§ 371 (c)(1), (2), (4) Date: Sep. 26, 2002

(87) PCT Pub. No.: WO02/064985

PCT Pub. Date: Aug. 22, 2002

(65) Prior Publication Data

US 2003/0051570 A1 Mar. 20, 2003

(30) Foreign Application Priority Data

Feb. 15, 2001 (DE) ........................................ 101 07 635

(51) Int. Cl.[7] ................................................ F16C 1/10

(52) U.S. Cl. ..................................... 74/502.6; 74/502.4

(58) Field of Search ............................ 74/500.5, 502.4, 74/502.6, 504.4, 504.6

(56) References Cited

U.S. PATENT DOCUMENTS

| | | | | |
|---|---|---|---|---|
| 3,205,727 A | * | 9/1965 | Severence | 74/500.5 |
| 4,601,448 A | * | 7/1986 | Miyazaki et al. | 248/56 |
| 4,642,859 A | | 2/1987 | Kaiser | |
| 4,685,350 A | | 8/1987 | Bauer et al. | |
| 4,951,524 A | * | 8/1990 | Niskanen | 74/502.4 |
| 4,967,987 A | * | 11/1990 | Swank | 248/68.1 |
| 5,347,882 A | * | 9/1994 | Klotz | 74/502.4 |
| 6,178,844 B1 | * | 1/2001 | Burger | 74/502.4 |
| 6,340,265 B1 | | 1/2002 | Suzuki et al. | |

FOREIGN PATENT DOCUMENTS

| | | |
|---|---|---|
| DE | 34 41 716 | 5/1986 |
| DE | 198 01 343 | 7/1999 |
| DE | 299 08 465 | 9/1999 |
| EP | 1 026 411 | 8/2000 |
| EP | 1 041 296 | 10/2000 |
| GB | 2 349 668 | 11/2000 |
| JP | 2000087947 | 3/2000 |
| JP | 2000-39016 | 8/2000 |

* cited by examiner

*Primary Examiner*—David A. Bucci
*Assistant Examiner*—Vicky A. Johnson
(74) *Attorney, Agent, or Firm*—McGlew and Tuttle, P.C.

(57) ABSTRACT

A fastening device for fixing a cable to a shift actuator or a transmission of a motor vehicle is provided. The device has a jacket end piece (5) jacketing the cable and a mounting element (6) accommodating the jacket end piece at the shift actuator or the transmission. The fastening device jacket end piece (5) has a circular groove (13) and the mounting element (6) has at least one projection (16, 17) engaging the groove in the fixed state of the cable (1). The mounting element (6) is provided with at least one spring element (7, 8) located in a plane extending in parallel to the plane of the groove. The design makes it possible to introduce a cable into a fastening device without taking into account its rotational position and to fix it there.

25 Claims, 4 Drawing Sheets

FIXING DEVICE FOR SECURING AN ACTUATING CABLE

FIELD OF THE INVENTION

The present invention pertains to a fastening device for fixing a cable at a shift actuating means or a transmission with a jacket end piece jacketing the end area of the cable and with a mounting element accommodating the jacket end piece at the shift actuating means or at the transmission.

BACKGROUND OF THE INVENTION

Fastening devices of the type described in the introduction are preferably used to fix cables for transmitting movements of a gearshift lever to an associated motor vehicle transmission. Solutions have been known here in which the fastening device is designed as a so-called bayonet connection, in which the jacket end piece and the mount belonging to it must be aligned in a certain direction in relation to one another, so that the corresponding active surfaces on the individual components can be locked with one another to fix the cable and are thus secured against separation. It is problematic in such solutions that if the cable is mounted early during the manufacture of the vehicle, its alignment is often not taken into account. Problems will therefore occur again and again during the subsequent assembly of the transmission and the shifting device, because readjustment of the cable must be performed, on the one hand, and, on the other hand, the cable is often subject to pretension in the locked state.

SUMMARY OF THE INVENTION

The object of the present invention is therefore to improve a fastening device of this type such that problem-free fixing of the cable at the shifting device of the transmission is made possible under all prevailing assembly conditions and, moreover, a fastening device is provided that permits inexpensive manufacture because of its simple design and the small number of components it comprises.

According to the invention a fastening device is provided for fixing a cable to a shift actuating means or a transmission with a jacket end piece jacketing the cable and with a mounting element accommodating the jacket end piece at the shift actuating means or the transmission. The jacket end piece has a circular groove and the mounting element has at least one projection engaging the groove in the fixed state of the cable, and the mounting element is provided with at least one spring element located in a plane extending in parallel to the plane of the groove. Thus, a distance corresponding to the installation conditions may be present between essentially at right angles to the longitudinal axis of the cable or coaxially to the longitudinal axis of the cable.

This combination of the features makes it possible to ignore a special installation position of the cable. Regardless of the rotational position of the cable to be mounted, the projection has the possibility of bringing about the fixation of the cable in the axial direction due to the circular shape of the groove, and the spring element prevents the jacket end piece from slipping out of the groove.

It proved to be advantageous, in particular, for the spring element to have two spring tongues located diametrically opposite each other.

A preferred embodiment of the subject of the present invention provides, moreover, for the spring element to have an essentially U-shaped recess with a bottom area and two elastic leg areas located opposite each other, the said leg areas forming the spring tongues and the bottom area having an annular shape adapted to the external diameter of the jacket end piece. The U-shaped form of the recess of the spring element makes it possible to easily introduce the jacket end piece between the spring tongues located opposite each other, and it makes possible at the same time the secure fixation in the bottom area of the mounting element.

In the cases in which the shift actuating means or transmission assembly unit has a plastic housing, the mounting element may be made in one piece with the respective housing together with the spring element. The number of individual components can thus be reduced further and the mounting of the cable can be simplified.

Should the housing of the shifting device be made of a metallic material, the spring element may be manufactured from an elastically deformable plastic or an elastic metal.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
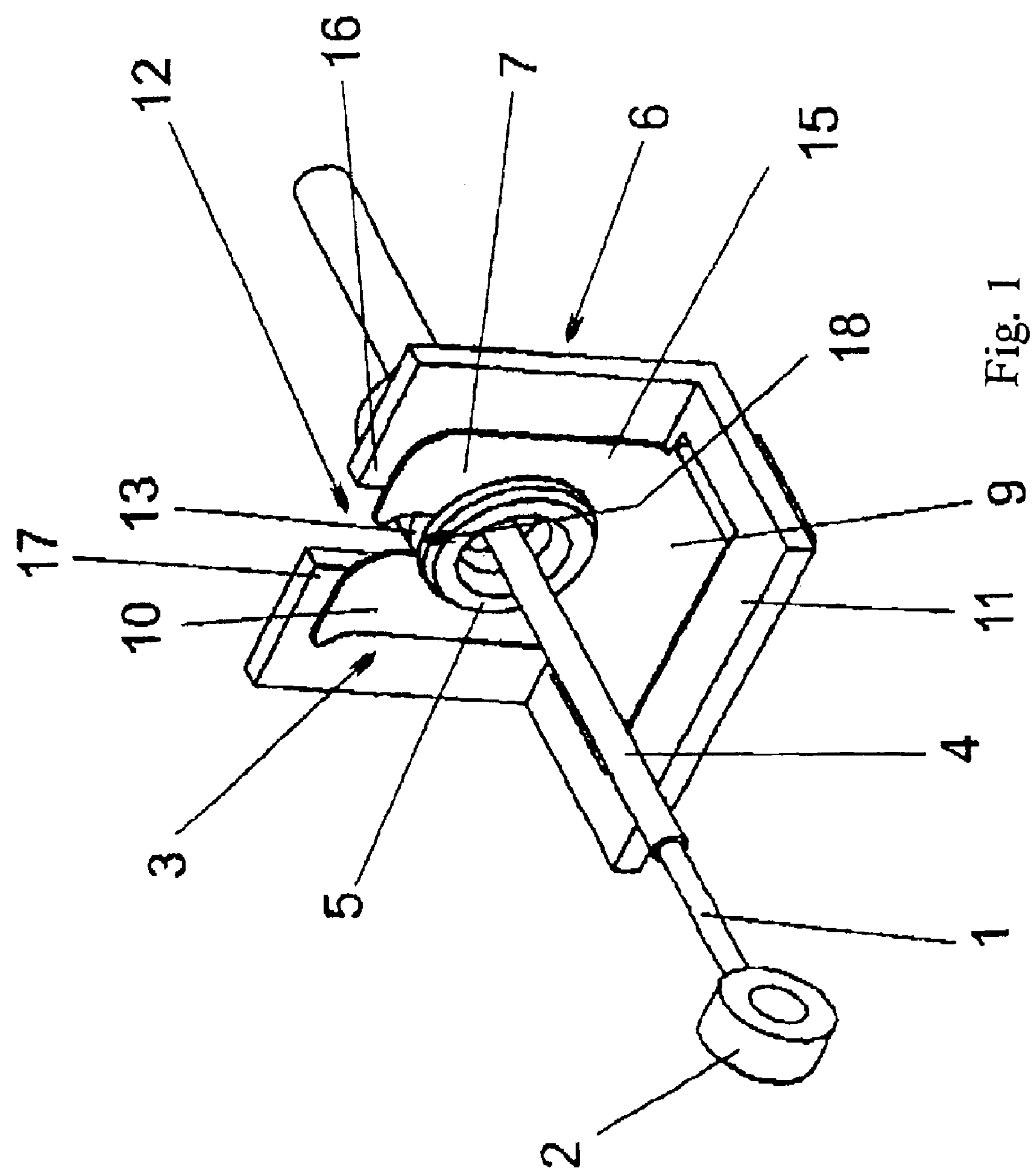
FIG. 1 is a perspective view of a first embodiment variant of the subject of the present invention.

Referring to the drawings in particular, FIG. 1 shows a cable 1 with a fastening lug 2 recognizable thereon for coupling the cable to a shifting device or the actuating lever of a transmission, which is fixed to a shift actuating means or a transmission of a motor vehicle, not shown more specifically, by means of a fastening device designated by 3 in its entirety. The cable 1 has a jacket 4, to which a jacket end piece 5 is fastened. The jacket end piece 5 is in turn accommodated in a mounting element 6. The mounting element 6 comprises a spring element 15 and two projections 16 and 17, which act as lateral limitations of a U-shaped recess and which engage a circular groove 13 on the jacket end piece 5 in the mounted state of the cable and thus prevent the jacket end piece 5 from being axially displaced in the longitudinal axis of the cable.

The spring element has an essentially angular shape with two legs 9 and 10 extending at an angle of 90° in relation to one another. The leg 9 of the spring element 15 is fixed to a housing part 11 of the shift actuating means according to this embodiment. The approximately vertically extending leg 10 arranged at an angle of 90° accommodation, as is apparent from FIG. 1, the outer surface of the jacket end piece 5 is an essentially U-shaped recess 18. As a result, the leg 10 forms two spring tongues 7 and 8, which prevent the jacket end piece from slipping out of the intermediate space between the spring tongues 7, 8 of the spring element in the mounted state. The cable 1 is mounted by pushing the jacket end piece provided with the groove 13 into the U-shaped recess 12 of the mounting element 6, and the external diameter of the now cylindrical jacket end piece 5 is inserted at the same time into the recess 18 of the spring element 15.

Figure 2:
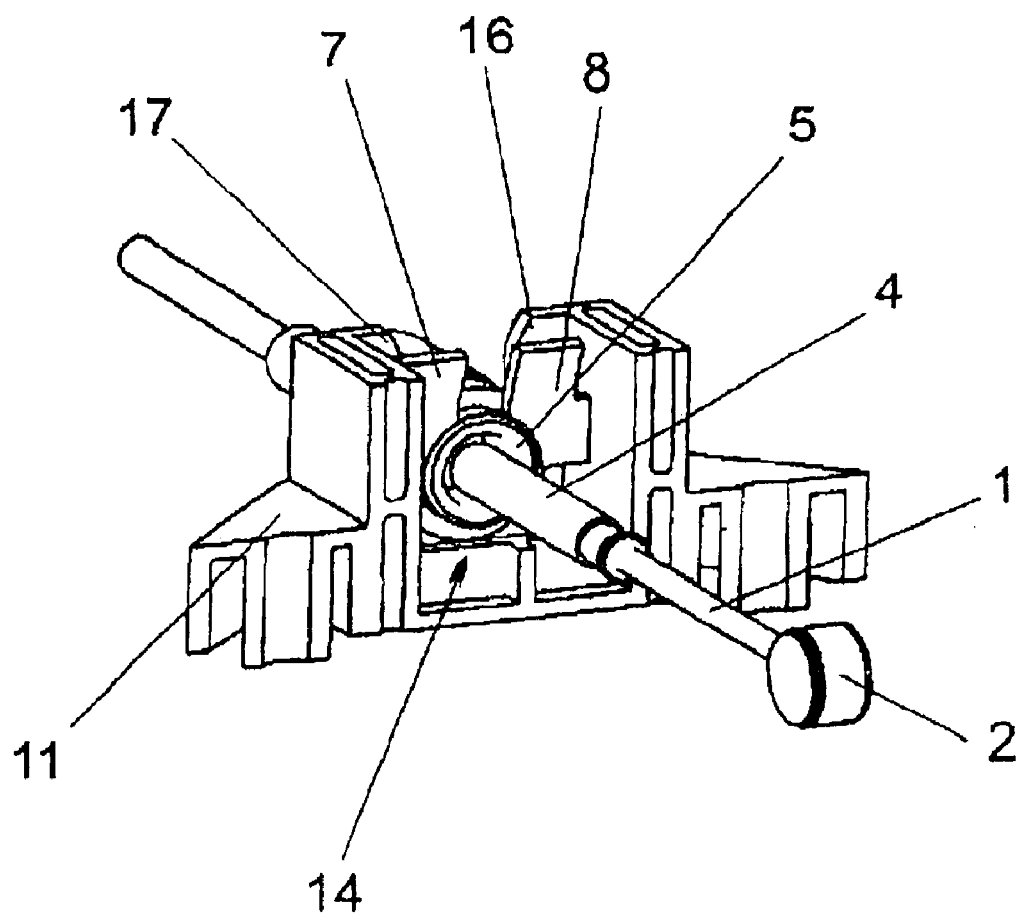
FIG. 2 is a perspective view of another embodiment variant.

FIG. 2 shows another embodiment variant of the fastening device, in which the cable 1 with the jacket 4 and the jacket end piece 5 corresponds to those to FIG. 1, but the mounting element 6 has a different design. The embodiment variant according to FIG. 2 pertains to shift actuating means whose housing 11 is manufactured from plastic. The plastic material of the housing part 11 makes it possible to manufacture the spring tongues 7 and 8 as well as the projections 16 and 17 in one piece therewith. The spring tongues 7 and 8 have an essentially rectangular shape in this exemplary embodiment and protrude on the inside from an essentially U-shaped recess 14 of the housing part 11. With their projecting free ends, the spring tongues 7 and 8 extend over the jacket end piece 5 in its installation position analogously to the view in FIG. 1.

Figure 3:
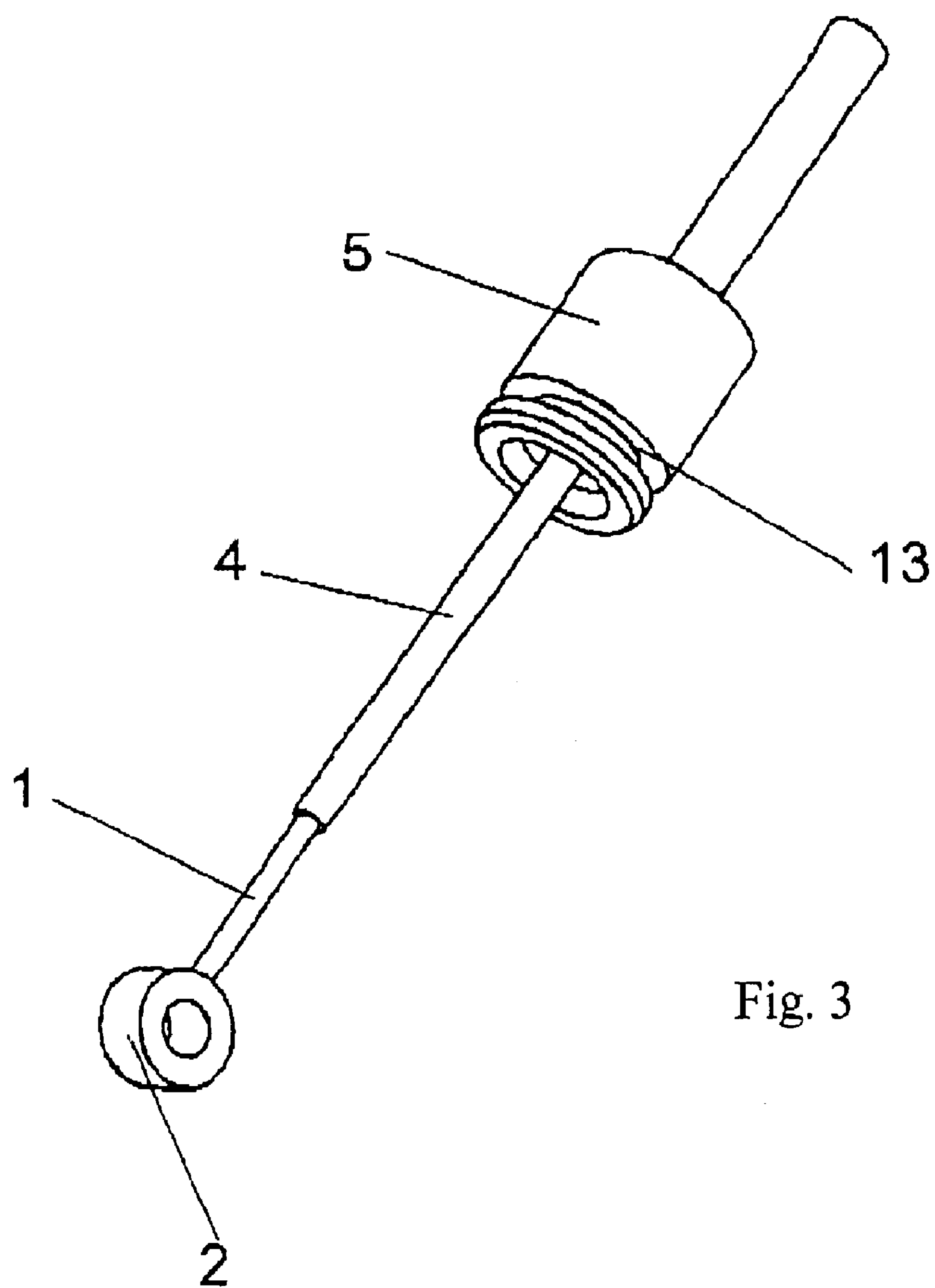
FIG. 3 is a perspective view of the end area of the cable to be fastened.

The end of the cable 1, which end is to be fixed to the shift actuating means, is shown once again in the view of FIG. 3 without adjoining components. The circular groove 13 of the jacket end piece 5, which makes it possible to fix the cable at the shift actuating means of a transmission in conjunction with the spring tongues described above, is shown clearly once again in this figure.

Figure 4:
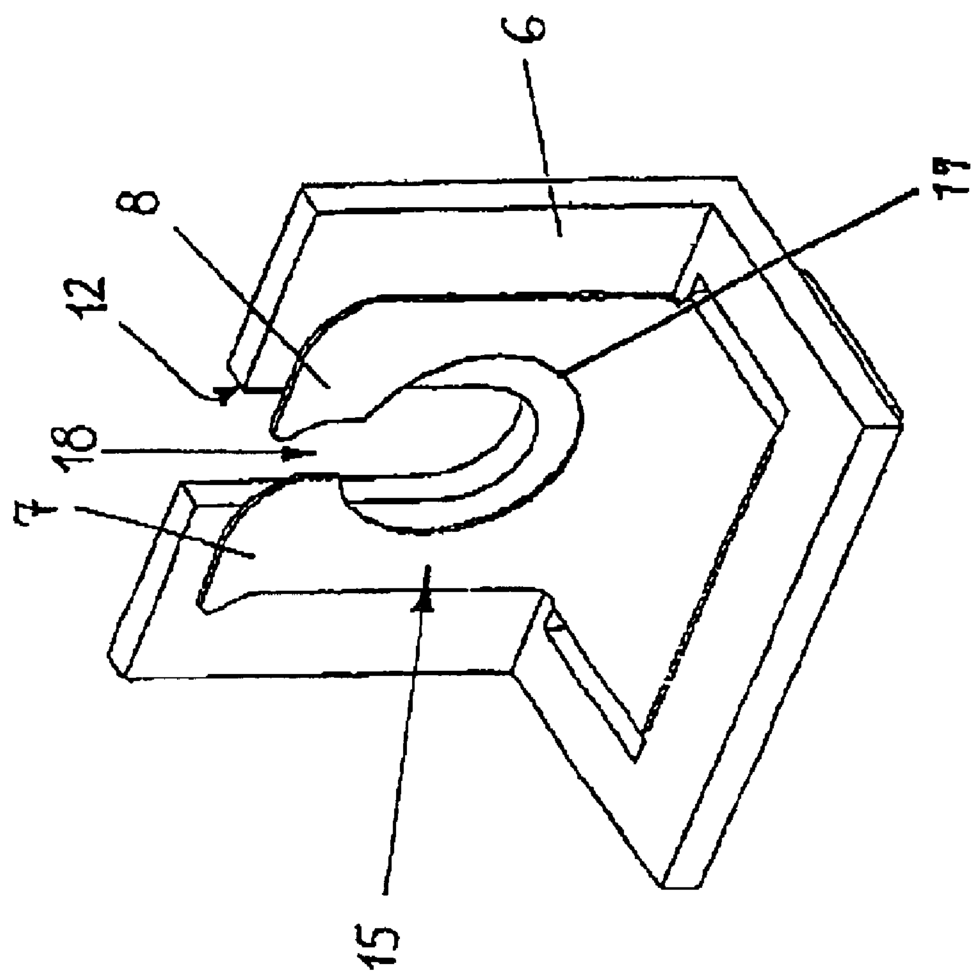
FIG. 4 is a perspective view of a part of the fastening device.

FIG. 4 shows a perspective view of a detail of a fastening device according to FIG. 1, but without the cable accommodated therein. The spring element 15 has two spring tongues 7 and 8 here, which are separated by a slot-like recess 18. Over its further course, the recess 18 passes over into a circular opening 19, whose diameter corresponds to the dimensions of the outer surface of the jacket end piece 5. The width of the recess 12 of the mounting element 6, which is recognizable in the perspective view behind the spring steel sheet 15, approximately corresponds here to the bottom diameter of the groove 13. The cable is thus secured in the axial direction in the mounting element by means of the groove connection of its jacket end piece 5, and the spring element 15 is used to prevent the jacket end piece 5 and consequently the cable 1 from loosening spontaneously from the recess 12. Thus, it forms a means for protection against loss.

While specific embodiments of the invention have been shown and described in detail to illustrate the application of the principles of the invention, it will be understood that the invention may be embodied otherwise without departing from such principles.

What is claimed is:

1. A fastening device for fixing a cable to a shift actuator or a transmission, the device comprising:

a jacket end piece jacketing the cable;

a mounting element accommodating said jacket end piece at the shift actuator or at the transmission, said jacket end piece having a circular groove and said mounting element having at least one projection engaging said groove in the fixed state of said cable; and a spring element connected to said mounting element and located spaced away from the groove and in a place extending in parallel to the plane of the groove, said spring element partially surrounding an outer surface of said mounting element.

2. A fastening device in accordance with claim 1, wherein said spring element has two spring tongues located diametrically opposite each other.

3. A fastening device in accordance with claim 2, wherein:

said jacket end piece is cylindrical;

said spring element has a recess with a first portion and a portion with a partially circular perimeter, a diameter of said partially circular perimeter corresponding to a diameter of an outer surface of said jacket end piece.

4. A fastening device in accordance with claim 2, wherein said spring element has an essentially U-shaped recess with a bottom area and two elastic leg areas located opposite each other, wherein the leg areas form spring tongues and a bottom area has an annular shape adapted to the external diameter of said jacket end piece.

5. A fastening device in accordance with claim 1, wherein together with said spring element, said mounting element is made in one piece with the shift

6. A fastening device in accordance with claim 1, wherein said spring element consists of an elastically deformable plastic.

7. A fastening device in accordance with claim 1, wherein said spring element consists of an elastic metal.

8. A fastening device in accordance with claim 1, wherein:

said spring element is axially spaced from said mounting element.

9. A fastening device in accordance with claim 1, wherein:

said jacket end piece is cylindrical and has an outer surface;

said spring element engages said outer surface.

10. A fastening device in accordance with claim 1, wherein:

said spring element engages said jacket end piece at a position spaced from said groove.

11. A shifter or transmission cable fastening arrangement, comprising:

a cable with a fastening element at an end and with a cable jacket;

a jacket end piece connected to said cable jacket, said jacket end piece having a reduced dimension portion with side walls defining a circular groove;

a mounting element having at least one projection engaging said groove in the fixed state of said cable; and a spring element connected to said mounting element and located away from and in a plane extending in parallel to the plane of the groove and partially surrounding said jacket end piece and not positioned between said side walls and said mounting element.

12. A fastening arrangement in accordance with claim 11, wherein said spring element has two spring tongues located diametrically opposite each other and extending on sides of said jacket end piece.

13. A fastening arrangement in accordance with claim 12, wherein said spring element has an essentially U-shaped recess with a bottom area and two elastic leg areas located opposite each other, wherein the leg areas form spring tongues and a bottom area has an annular shape adapted to the external diameter of said jacket end piece.

14. A fastening arrangement in accordance with claim 11, wherein said spring element and said mounting element are made in one piece.

15. A fastening arrangement in accordance with claim 11, wherein said spring element comprises an elastically deformable plastic.

16. A fastening arrangement in accordance with claim 11, wherein said spring element comprises an elastic metal.

17. An arrangement in accordance with claim 13, wherein:

said jacket end piece is cylindrical;

said spring element has a recess with a first portion with side edges and a portion with a partially circular perimeter connected at one end to said side edges, a diameter of said partially circular perimeter substantially corresponding to a diameter of an outer surface of said jacket end piece.

18. An arrangement in accordance with claim 11, wherein:

said spring element engages said jacket end piece at a position spaced from said groove.

19. An arrangement in accordance with claim 11, wherein:

said spring element is axially spaced from said mounting element.

20. A fastening device for fixing a cable to a shift actuator or a transmission, the device comprising:

a jacket end piece with an outer surface and a first end and a second end, said jacket end piece surrounding the cable, said jacket end piece having a reduced dimension portion with a first groove sidewall and a second groove sidewall defining a groove, said outer surface extending from said first groove sidewall to said first end and from said second groove sidewall to said second end;

a mounting element having at least one projection extending into said groove to fix said cylindrical jacket relative to said mounting element; and a spring element having first and second flange portions each with a facing inside arcuate edge which together define a generally circular perimeter opening with an inside diameter, said spring element being connected to said mounting element and being disposed adjacent to said cylindrical jacket end piece at a location between said first groove sidewall and said first end.

21. The fastening device according to claim 20, wherein:

said first and second flange portions have tip regions spaced apart to define a recess leading into said circular perimeter opening; and said cylindrical jacket end piece has a maximal diameter and said circular perimeter opening has a diameter corresponding to said maximal diameter.

22. The fastening device according to claim 20, wherein:

said jacket end piece is cylindrical; and said circular opening surrounds said outer surface of said jacket end piece.

23. The fastening device according to claim 22, wherein said circular groove is arranged on said outer surface.

24. The fastening device according to claim 23, wherein:

said jacket end piece is cylindrical and has an outer surface diameter; and said groove is annular and has a groove diameter that is smaller than said outer surface diameter.

25. A cable fastening arrangement comprising:

a cable with a fastening element at an end;

a cable jacket encasing said cable at a point spaced away from said end;

a cylindrical jacket end piece covering a portion of said cable jacket, said cylindrical jacket end piece having an outer surface with an annular groove with two groove side walls and an indented diameter narrower than said surface diameter;

a groove mounting means for keeping said cylindrical jacket end piece from slipping axially, said groove mounting means further comprising:

a mounting element having at least one projection engaging said circular groove in the fixed state of said cable; and an outer surface mounting means for keeping said cylindrical jacket end piece from slipping radially, said outer surface mounting means further comprising:

a spring element with a first end connected to said mounting element and a second end flange having first and second portions, an arcuate inside edge of said first and second portions together defining a generally circular perimeter opening with a diameter corresponding to said surface diameter, said flange located in a plane extending in parallel to the plane of said circular groove, said circular perimeter opening enclosing said surface diameter at a distance away from an intermediate space between said two side walls and said mounting element in the axial direction of said cylindrical top surface jacket.

* * * * *